United States Patent [19]

Roberts

[11] Patent Number: 4,603,621
[45] Date of Patent: Aug. 5, 1986

[54] BEVERAGE-MAKING DEVICE
[75] Inventor: Melvin F. Roberts, Niles, Ill.
[73] Assignee: Bloomfield Industries, Inc., Chicago, Ill.
[21] Appl. No.: 778,909
[22] Filed: Sep. 23, 1985

Related U.S. Application Data

[62] Division of Ser. No. 633,417, Jul. 23, 1984.

[51] Int. Cl.$^4$ ............................................. A47J 31/06
[52] U.S. Cl. ........................................ 99/307; 99/295; 239/600
[58] Field of Search ...................... 99/295, 300, 302 R, 99/304, 307, 301, 305, 306, 281, 282, 279, 283; 239/600

[56] References Cited

U.S. PATENT DOCUMENTS

| | | | |
|---|---|---|---|
| 2,839,988 | 6/1958 | Tritt | 99/282 |
| 3,371,593 | 3/1968 | Price | 99/307 |
| 3,793,934 | 2/1974 | Martin | 99/282 |
| 4,354,427 | 10/1982 | Filipowicz | 99/307 |
| 4,457,217 | 7/1984 | Ogawa | 99/295 |
| 4,527,745 | 7/1985 | Butterfield | 239/600 |

Primary Examiner—Robert W. Jenkins
Attorney, Agent, or Firm—Lee, Smith & Zickert

[57] ABSTRACT

An improved beverage-making device, particularly useful for brewing coffee, provides a safety thermostat arrangement for quickly detecting excessive temperatures of a hot water container generally near a heating element arranged therein. A running thermostat provides a self-supporting sensing tube means in cooperation with a capillary tube and thermostat which detect the mean temperature of the hot water and are responsive to a narrow range of temperature variations within the hot water container. The improvement further includes a tap-off hot water system which provides hot water separately and independently of the brewing water heated in said container. The system is connected upstream of the cold water inlet valve of the device and directs cold water into a water coil means residing within the hot water container. Outlet pipe means convey heated water from the coil to an outlet faucet projecting exteriorly of the device. An improved spray disk assembly provides a cooperatively lockable spray disk and mounting collar. The spray disk locks with the mounting collar to tightly seal a flexible gasket around said spray disk whereby the spray disk receives hot water siphoned from said hot water container and evenly distributes hot water in a random dripping flow through the disk. Additionally, a bottom drain system is provided for emptying the hot water container which is non-corrodible and thread disengageable from said container. The drain system provides means for tightly sealing around a bottom drain hole of the container and manually operable valve means to facilitate draining the container.

5 Claims, 15 Drawing Figures

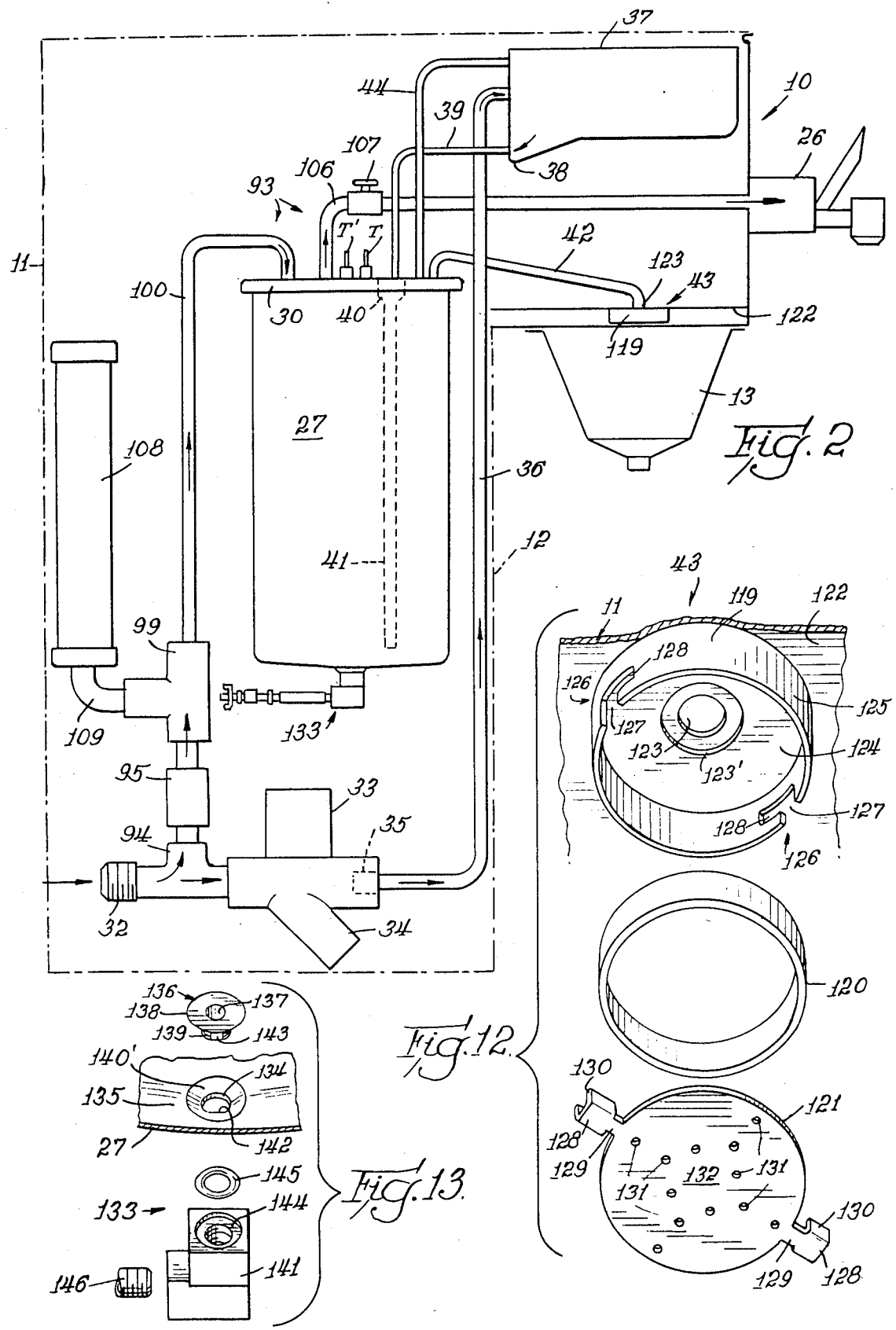

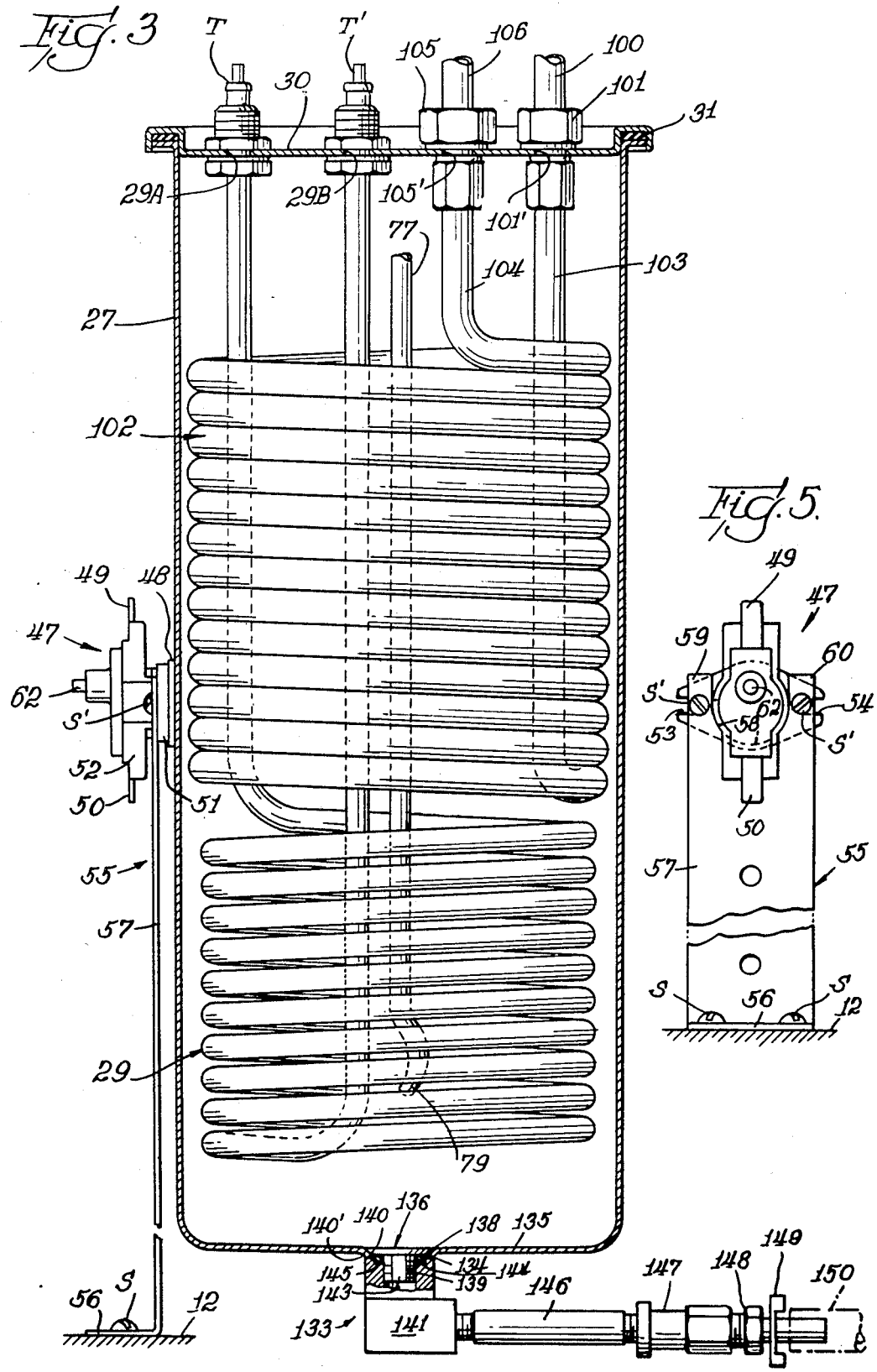

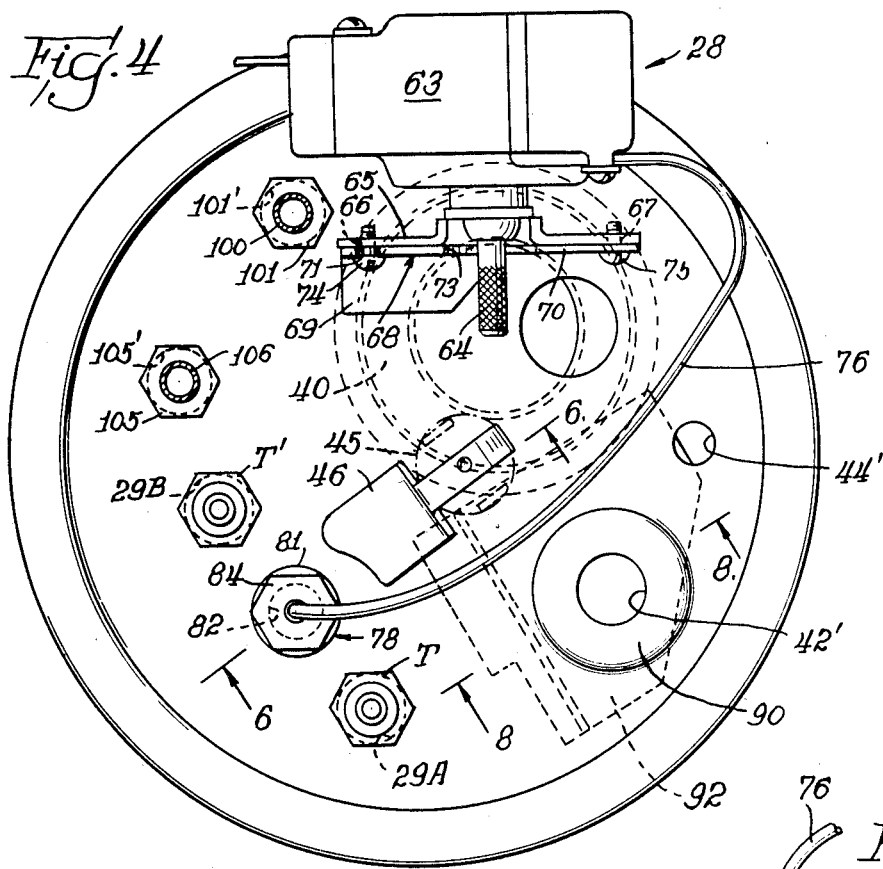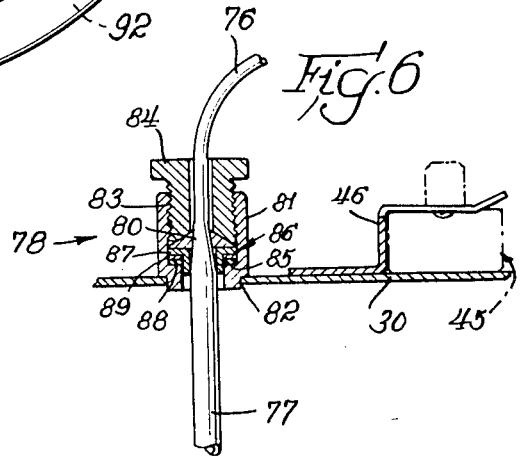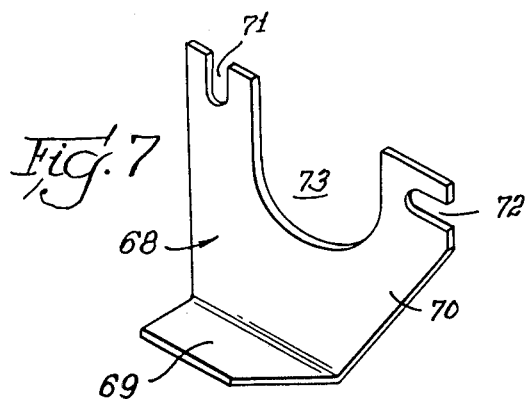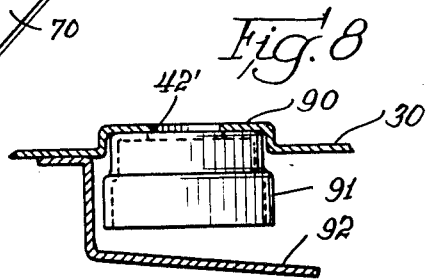

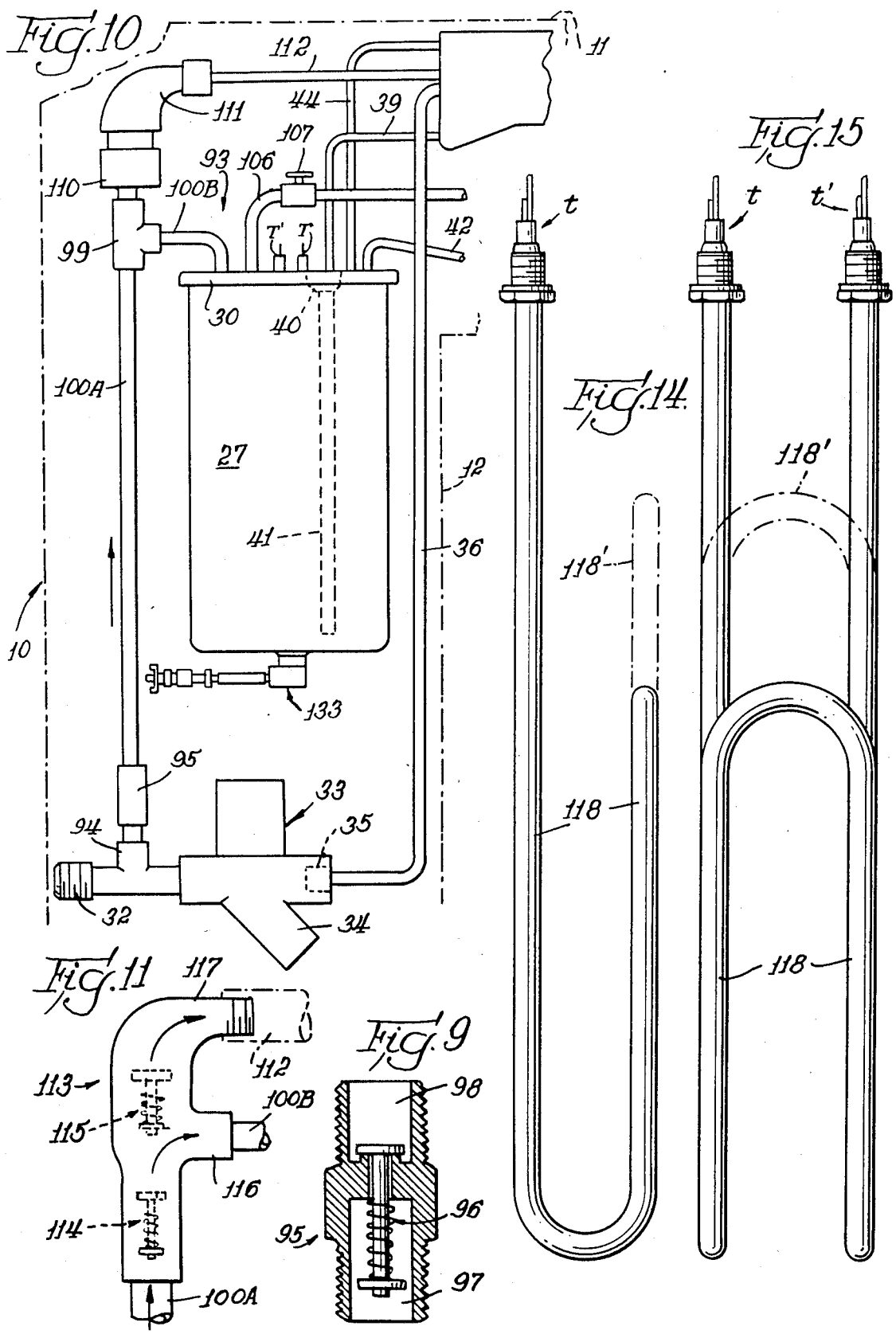

BEVERAGE-MAKING DEVICE

This application is a divisional application of Ser. No. 633,417, filed July 23, 1984.

BACKGROUND AND SUMMARY OF THE INVENTION

The invention relates to a beverage-making device which constitutes an improvement over the prior art, particularly directed to those devices which automatically brew coffee.

In such devices, a water supply line is in direct communication with an inlet valve for on-demand admittance of cold water to a water-heating container in which a constant source of hot water for brewing is available. The inlet valve is electrically operated to open for a preset brewing cycle equal to the amount of time required to provide sufficient liquid to fill a receiving decanter, such as a coffee pot.

A running thermostat senses the temperature in the water container and electrically communicates with a coiled, or looped, heating element so that the constant desired temperature is maintained.

Water systems for admitting cold water to the container include inlet tube means for dispensing the incoming water at the bottom of the container. As the cold water enters, displaced volumes of hot water at the top of the container are siphoned from the container to a brewing chamber, which is manually pre-filled with a load of fresh ground coffee. As incoming water reduces the water temperature in the container, the running thermostat senses this lower temperature and activates the heating element. The heating element remains energized until the thermostat senses that the required water temperature has been reached. With high capacity electric heating elements, a substantial temperature increase occurs over a short period of time. Should the running thermostat fail in the on position, a so-called "run away" condition will result whereby the heater will stay energized. Thereafter, the heating element will quickly evaporate the water and reach a dangerously high temperature. In order to prevent overheating, conventional systems include high limit thermostats. A high limit thermostat serves to de-activate the heating element when excessive temperatures are sensed. This safety feature is particularly useful when someone has inadvertently failed to fill the water container prior to initiating a brewing cycle. Without this feature the running thermostat would blindly sense the ambient air temperature inside the empty container. In response, the heating element would continue to operate until reaching a dangerous "red-hot" condition.

Customarily, the hot water container is provided with a hermetically sealed cover which supportively accomodates the aforesaid siphon, running and high limit thermostats, and inlet tube means, as well as the terminals for the heating element. A drawback to this typical arrangement is that only the temperature at the cover is sensed by the high limit thermostat. As a result, an excessively high temperature at lower portions of the container, localized near the heating element, can sometimes occur while the cover remains relatively cool. The remote disposition of a high limit thermostat at the container cover is inherently inefficient for detecting these temperature fluctuations at the bottom half of the container. A thermostat system which can immediately detect this dangerous condition, and promptly de-activate the heating element, would be a significant achievement.

Running thermostats are typically connected to an enlarged sensing bulb by means of a thin capillary tube. The bulb end is usually positioned at the lower half of the container. The capillary tube must therefore extend downwardly into the container to reach the bulb end. A long guide sleeve is used to hold the bulb in place. The guide sleeve is attached to the cover and extends downwardly into the container to surround and protect the capillary tube and the full length of the enlarged bulb end. Usually, guide sleeves are secured to the bottom of the heating coil so that the bulbs are fixed in the proper orientation. Deficiencies in this conventional arrangement have been encountered. Firstly, the enlarged bulb end is limited to only sensing temperatures in the vicinity of the bottom half or third of the container. Temperatures at the upper portions are not detected, and may in fact be sufficiently high to brew coffee without further activation of the heating coil. It would be considerably more advantageous to detect the mean temperature of the entire water volume. Secondly, conventional enlarged bulb thermostats have a temperature-sensing spread of about 6°–8° F. Thereby, the heating element is not quickly activated when the water becomes too cool and, once activated, will unnecessarily remain on for a period of time after the water has reached the desired temperature. A thermostat arrangement that reacts to smaller temperature changes would be economically beneficial, since the heater would be activated soon after the water falls below the usual brewing temperature of 205° F. and then de-activated very shortly after this is attained.

The guide sleeve arrangements in the prior art have hindered maintenance procedures. In order to remove the thermostat and bulb for repair, the cover has had to be removed in order to disconnect the guide sleeve from the heating element. It would be a great aid to repair personnel to eliminate the need for a guide sleeve and provide a running thermostat, capillary tube and sensing tube that are completely disengageable from the device without requiring other components, such as the cover, to be disconnected or disturbed. A self-supporting sensing means would greatly advance the solution to this problem. Savings in maintenance time and repair costs would be made.

Automatic beverage-making devices have also included means for dispensing hot water for making tea, instant soup and the like. In the past these systems simply drained hot water directly from the water container. By extracting a volume of hot water from the container, the brewing capability of the device is diminished. Should a contemporaneous brewing cycle be desired, the container must first be re-filled with colder inlet water and then heated to elevate the temperature of the water to the necessary brewing level. The re-filling step has usually been initiated by the provision of a float switch arranged in the upper portion of the container which detects the drop in the water level. The inlet valve is electrically controlled by the switch which signals it to open until the float is satisfied. Due to lime build-up the switches can close and become inoperable. A hot water system that eliminates the need for a float switch would be a significant advance in the art. It would also be a valuable improvement to provide a hot water system which does not borrow from the water in the container but still makes hot water instantaneously available for these other purposes.

In order to distribute the siphoned hot water over the coffee grounds, typical beverage-making devices utilize resiliently biased spray means over which the siphoned water is directed. The spray means is usually a flat, perforate disk. Other devices have used a showerhead type arrangement wherein a siphon tube nozzle fluidly communicates with a spray means that is concave rather than disk-shaped. Spray means, in either form, provide for sprinkling hot water over the coffee grounds, which are disposed in the brewing basket, or chamber, therebelow. For effective brewing to take place, a "lazy" drip from the spray means is preferred for a uniform distribution of hot water over the ground coffee. A common problem, particularly with flat spray disks, has been that the siphoned water is too forcefully emitted in streams through a series of disk orifices which create an equal number of holes bored into the mound of coffee grounds. Quite oppositely, the desired drip phenomenon is an even flow over the grounds. It would therefore be of great value to provide a moderately paced gravity drip system which eliminates individual spray streams through the disk orifices onto the ground coffee. Spray disks also require cleaning due to the accumulation of lime deposits and other sediments found in water lines. As a result, the disks need to be removed for cleaning. The usual resilient connections between spray disks and associated mounting collars render the disks removable, but are inadequate for achieving a tight engagement therebetween. A tight seal between the periphery of the spray disk and mounting collar is highly desirable so that the siphoned hot water will not leak around the edges of the disk, but will be emitted only through the orifices.

Accordingly, a more effective interconnection between a spray disk and mounting collar would be a significant improvement over the foregoing devices. A positively locking connection would void the disadvantages of the resilient connections found in the prior art. It would also be beneficial to provide a tight sealed engagement that also snugly lodges a flexible gasket between the outer edge of the disk and the collar. Thereby, edge leakage would be prevented and a random drip pattern attained for the preferred even distribution of hot water over the coffee grounds.

For standard size automatic beverage-making devices, the hot water container normally holds at least three times the volume of a conventional coffee pot and usually takes the form of cylinder having a greater height than width. Cleaning these relatively large containers is necessary for taste and sanitary reasons. In order to remove sedimentation, such as lime deposits, the prevailing technique involves operating the beverage-making device for several cycles with a de-liming solution pumped through the container. Often, sediments at the container bottom are not dissolved and must be manually removed. In a more rudimentary cleaning method, the container is simply tipped over to empty the water. The latter is clearly an awkward and undesirable technique. A bottom drain, which allows the container to be fully emptied, would be preferable. Prior art devices have failed to provide a separate bottom draining system, probably due to the problems encountered with attaching drain tubes. The customary manner of affixing drains to metal containers is by welding. A disadvantage to such fittings is that the welds corrode and result in leakage. Welding also creates a fixed drain connection which impedes removing the container for repair and otherwise generally limits access to other components inside the device. It would accordingly be of significant value to provide a non-welded bottom drain system which avoids corrosion and leakage problems. In addition, it would be advantageous for the drain system to be disengageable to permit easy access to the interior of the device for the repair, or replacement, of mechanical and electrical components.

The present invention offers an improvement for beverage-making devices of the type described, which satisfies the needs set forth above. The invention may be briefly summarized as comprising, in part, a safety thermostat arranged with the container generally near the heater, which facilitates the prompt detection of excessive temperatures long before the cover becomes overheated. Thereby, a temperature increase can be immediately sensed in order to de-activate the heating element prior to reaching a dangerous condition.

An improved running thermostat system is provided, which senses the mean temperature of the entire volume of water and has a more precise temperature-sensing spread than found with previous devices. The thermostat communicates with the water by means of a self-supporting elongate sensing tube that extends for substantially the full height of the container and is connected to the thermostat by means of a capillary tube disposed outwardly of the cover. The unique thermostat and sensing tube arrangement is independently removable from the beverage-making device without disturbing the container cover or any other components.

The improvement further includes a tap-off hot water system which communicates with the incoming water supply upstream of the inlet control valve. The tapped-off water is directed into a water coil system arranged inside the container whereby the surrounding brewing water serves to heat the tapped-off water. When needed, the hot water is directed to flow through the coil to a hot water faucet located at the exterior of the device. The volume of hot water available for brewing coffee is therefore not reduced.

Also, an improved spray disk assembly forms part of the invention. The assembly eliminates resilient attachment and instead securely, but removably, locks a spray disk to a mounting collar above the brewing chamber. The disk is easily removed with a simple twisting motion without the need for tools. The improved spray disk assembly includes a sealing gasket which is tightly held against the mounting collar so that leakage around the periphery of the disk is eliminated. A series of orifices extend through the disk but a direct spray through each is avoided, and a random "slow-drip" for effective brewing is obtained.

A unique container draining system is additionally provided which associates with an aperture at the bottom of the hot water container. The system includes a flanged drain fitting partly arranged interiorly of the container and partly extending through the aperture to be thread-engaged with an elbow and coupling assembly in a tightly sealed connection. A conventional valve is connected to the coupling means and is manually operable to facilitate emptying the water container. The system eliminates the problems with welding and affords quick disengagement from the container to allow easy access to the interior of the device.

BRIEF DESCRIPTION OF THE DRAWINGS

The improved beverage-making device is described in conjunction with the following figures in which like reference numerals are used throughout to identify the same components, wherein:

FIG. 2 is a schematic view of the entire water flow system for the beverage-making device of FIG. 1, diagrammatically showing the tap-off hot water system, spray disk assembly and bottom drain system of the invention;

FIG. 3 is a composite vertical cut-away section and elevational view of portions of the improved beverage-making device of FIG. 1 showing the hot water container and container cover cut-away to expose, in elevation, the safety thermostat arrangement to one side of the container, the bottom drain system at the bottom of the container, the electric heating coil having a pair of terminals mounted at the cover, the water coil of the hot water system having inlet and outlet tubes mounted by means of compression fittings at the cover, and the sensing tube for the running thermostat system broken-away just below the cover; other components of the beverage-making device, including the locking means for mounting the sensing tube to the cover, the running thermostat, and a bracket for altermately mounting a safety thermostat on the cover, are deleted from FIG. 3 for purposes of clarity and explanation, and are shown in detail in the other Figures.

FIG. 4 is a plan view of the hot water container cover assembly, including the improved running thermostat system associated therewith and the inlet and outlet openings for the water coil shown in FIG. 3;

FIG. 5 is a front elevational view of the improved safety thermostat arrangement as shown in FIG. 3;

FIG. 6 is a sectional view taken along lines 6—6 of FIG. 4 showing the locking assembly for mounting the sensing tube of the running thermostat system to the container cover and a conventional bracket used for mounting a safety thermostat at the cover;

FIG. 7 is a perspective view of the mounting bracket for the running thermostat as shown in FIG. 4;

FIG. 8 is a sectional view taken along lines 8—8 of FIG. 4 showing the outlet cap and baffle used for controlling the discharge of brewing water siphoned from the container into a siphon tube;

FIG. 9 is a sectional view of a check valve provided for the hot water system as shown in FIG. 2;

FIG. 10 is another schematic view of the entire water flow system of the beverage-making device, diagrammatically showing an alternative embodiment for the tap-off hot water system;

FIG. 11 is a sectional view of an alternate combination check and relief valve provided for use in the hot water system shown in FIG. 10;

FIG. 12 is an exploded perspective view of the improved spray disk assembly as shown in FIG. 2;

FIG. 13 is an exploded perspective view of a portion of the bottom drain system as shown in FIG. 3;

FIG. 14 is a side view of an alternate looped heating element usable in conjunction with the invention; and, FIG. 15 is a front view of the heating element as shown in FIG. 14.

DETAILED DESCRIPTION OF THE PREFERRED EMBODIMENT

Introduction

Figure 1:
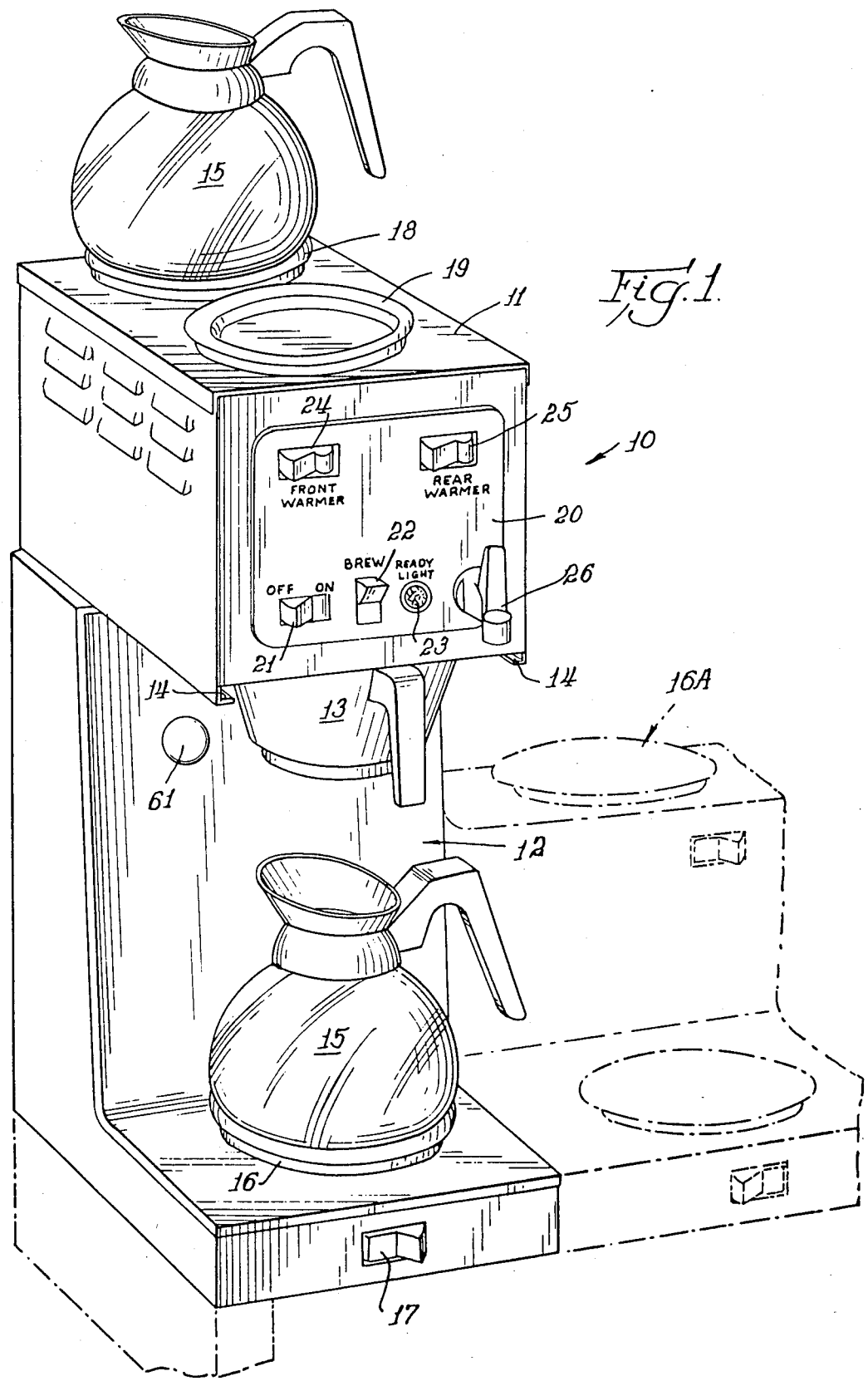
FIG. 1 is a perspective view of a beverage-making device having the improvements of the invention housed therein.

FIG. 1 is a perspective view of the exterior of a coffee-making device 10 which has a generally well-known design and includes an upper housing 11 and lower housing 12. A brewing chamber 13 is removably held by a conventional slide track means 14 in position for receiving hot water siphoned from a heated tank disposed inside lower housing 12. A decanter, or coffee pot 15, is stationed on a warmer 16 and collects incoming brewed coffee from the chamber. The warmer is activated in the usual way by a switch 17. To keep previously brewed portions of coffee warm, the upper housing 11 includes two warmers 18 and 19. A decanter 15 is filled with coffee and is shown stationed at warmer 18. The coffee maker 10 may also employ an auxiliary warmer unit 16A of conventional design, shown in phantom lines in FIG. 1.

The coffee maker 10 is operated by means of a control panel 20, which includes a main switch 21, a brewing cycle switch 22 and a ready light 23. The switch 21 activates the electrical system of the coffee maker whereby a heating element and thermostat arrangement cause a stored volume of water to be heated to a desired brewing temperature, as will be hereinafter described. A ready light 23 is illuminated when the system is ready to provide hot water for brewing coffee. At that point, a brewing cycle may be initiated by depressing the switch 22, whereupon the hot water is siphoned onto coffee grounds contained within the chamber 13. Warmers 18 and 19 are operated by the switches 24 and 25 located near the top of the panel 20.

The control panel 20 further includes a hot water faucet 26 extending outwardly therefrom, which provides means for dispensing water from the tap-off water system of the invention, as will be described below.

FIG. 2 is a schematic drawing of the internal components of the coffee maker 10. The upper housing 11 and lower housing 12 are shown in dashed lines. It will be understood that the electrical circuitry for the device 10 is provided in a conventional manner, such as found in the wiring system for Model Nos. 8714 and 8715 made by Bloomfield Industries, Inc., Chicago, Ill. The relationships of the various components in the wiring scheme, including the improved safety thermostat arrangement and the running thermostat system of the invention, are intended to be connected in the circuit in this known manner, and the circuitry therefore forms no part of the invention.

With reference to FIGS. 2-4, it will be seen that the coffee-making device 10 includes a hot water container, or tank, 27 which is initially filled with a predetermined volume of water. In the illustrative embodiment, the tank 27 holds approximately one gallon when filled to the intended maximum level of about one-half inch below the top of the container. When the switch 21 is on, the temperature of the water inside the tank 27 is monitored by an improved running thermostat system 28. The required brewing temperature is in the range of from about 200° F. to about 205° F. To facilitate heating the water, a sheathed electrical heating coil 29 is arranged within the tank and is in electrical communication with the running thermostat system 28. When the running thermostat system 28 detects that the water temperature has fallen below the desired range, the system closes a circuit and activates the heating coil 29 until such time that proper brewing temperature is achieved within the container 27. The ready light 23 is electrically controlled by the running thermostat system and is not illuminated until the heating element is de-activated.

As best viewed in FIGS. 3 and 4, a cover 30 closes the open top of the tank 27 and is hermetically sealed thereto by means of a gasket 31 disposed between the upper rim of the tank and the peripheral lip of the cover in a known manner. The hot water is thereby safely sealed within the tank.

When freshly brewed coffee is desired, the brewing basket, or chamber 13 is lined with filter paper and then manually loaded with a predetermined amount of ground coffee. The coffee pot 15, as shown in FIG. 1, may then be placed onto the warmer 16 in position to receive brewed coffee from the chamber 13. Brewing cycle button 22 is then pushed to initiate the brewing sequence.

The water flow system for providing brewing water to the chamber 13 is best understood with reference to FIG. 2, wherein a water inlet pipe 32 is arranged at the bottom portion of the housing 12 and is connected to a water supply line (not shown). The inlet pipe 32 is in fluid communication with a solenoid valve 33 which is operated by a conventional timer means that begins its sequence when the button 22 is activated. The timer is calibrated to open the valve 33 for the period of time required to admit a volume of water sufficient to fill the coffee pot 15. The valve 33 includes a cleanout 34 to enable it to be backflushed when lime deposits accumulate at the valve. The flow rate from the valve 33 is controlled by an internal flow control valve 35, which in the exemplary embodiment permits 0.75 gallons per minute to pass into an inlet pipe 36. The inlet pipe 36 directs the cold water upwardly into a basin 37 disposed within upper housing 11. The basin 37 is formed to have a drain sump 38 for draining incoming water into a tube 39. Tube 39 directs the water through an aperture 39' of cover 30 and terminates thereat to open into a funnel 40. Funnel 40 is affixed to the bottom of the cover around aperture 39'. An inlet tube 41 is connected to the funnel 40 and extends downwardly into the container 27 to discharge the cold water near the bottom of the container. The entering cold water displaces an equal volume of hot water near the top of the container 27 which flows into a siphon tube 42.

With reference to FIGS. 4 and 8, it will be noted that a raised annular shoulder 90 projects upwardly from the cover 30 and has a central aperture 42' into which the siphon tube 42 is attached to be in fluid communication with the hot water. An outlet cap 91 and a baffle 92 are welded at the undersurface of the shoulder 90 in a typical construction whereby the rising, displaced hot water is controlled in its passage upwardly through the aperture 42' into the siphon tube. The siphon tube 42 slopes downwardly from the top of the container and discharges the hot water into a spray disk assembly 43, which distributes the water over the coffee grounds in brewing chamber 13.

Following the timed sequence, the valve 33 is closed, and the heated water within the brewing chamber 13 bathes the coffee grounds therein, whereby brewed coffee seeps from the chamber, by gravity, into the decanter 15. It will be understood that the calibration of the timer means will preferably be made so that the portions of water absorbed by the grounds and lost in the form of steam are taken into account in order that the decanter is filled to the necessary level.

In the event that pressure is built up within the container 27, a vent tube 44 is affixed to the cover 30 at the aperture 44' to communicate interiorly of the container 27. The vent tube extends upwardly from the cover 30 to enter the basin 37 for discharge therein. Accordingly, excess water pressure will be relieved into the basin and be safely drained back into the container via the drain sump 38.

Since the cold inlet water decreases the tank water temperature, the running thermostat system 28 will activate the electrical heating element 29, in the manner mentioned above. Following a brewing cycle, rapid heating sometimes occurs with certain high capacity heating elements. If the running thermostat is faulty and sticks in the on position, a back-up safety provision is needed to de-energize the heater before the water completely boils away and the element overheats. In FIG. 4, a typical arrangement for a safety thermostat 45 is shown in phantom lines and provides a means for detecting an overheating of the cover 30. A standard bracket 46, shown in solid lines, offers the mounting means for the safety thermostat 45. In coffee-making devices of the type described, the running thermostat and the safety thermostat are connected in series with the heating element whereby the safety thermostat will override the running thermostat to de-activate the heating element when the cover reaches these overheated temperatures. Generally safety thermostats are manufactured to have an open temperature of about 226° F. This conventional arrangement has been satisfactory for heating elements of 1800 watts or less, such as the looped elements 118 and 118' shown in FIGS. 14 and 15, and therefore may be practiced with the other features of the invention herein described for these lower capacity elements. Therefore, the cover 30 is preferably provided with a bracket 46 in the event that the coffee maker 10 is provided with the lower capacity heating elements. However, the arrangement of the thermostat 45 has been found to be inefficient for the higher capacity elements which can quickly overheat the lower portions of the container 27 long before the cover 30 becomes equally hot.

Improved Safety Thermostat Arrangement

With reference to FIGS. 3 and 5, an improved safety thermostat arrangement is shown for use with the high capacity heating elements and replaces the existing techniques, such as the thermostat 45 of FIG. 4. In the preferred embodiment, the heating coil 29 is a 230 volt, 4800 watt, 11 loop coil. Other high capacity heating elements, similar to the heating element 29, may alternatively be provided, such as a 120 volt, 2000 watt coil having 5 loops, or a 230 volt, 3500 watt coil having 8 loops.

The top loop of the coils is connected to a conventional terminal assembly T by a vertical section of the heating element. The bottom loop of the coil is connected to a conventional terminal assembly T' by a vertical section of the element. Both of the terminal assemblies T and T' provide water tight connections with cover 30 at terminal openings 29A and 29B, as best viewed in FIGS. 3 and 4.

It will be observed that the loops of the coil 29 extend annularly near the side of the container 27. At these locations rapid increase in temperature can occur. In solution of the problems with prior art systems, there is provided a manually resettable thermostat 47 preferably mounted adjacent the container 27 at or below the midpoint thereof and generally close to the heating coil. The thermostat 47 has an exposed bi-metal disk 48 disposed against the side of the container. In the exemplary embodiment, the thermostat 47 is an Essex International Controls Division thermostat Model No. 404-58 having an open temperature of 226° F.±9° F. The thermostat 47 includes terminals 49 and 50 which are of the spade-type variety, whereby the thermostat 47 is wired to be in series with the running thermostat system 28. The thermostat 47 includes a mounting plate 51 affixed to a housing 52 of the bi-metal disk 48. The plate 51 extends transversely to the terminals 49 and 50 and has sidewardly-open notches 53 and 54 at opposite sides thereof. A cooperative bracket 55 is disclosed for the positioning of the thermostat 47 at the desired location along the tank 27. The bracket 55 is preferably made of stainless spring steel and has a mounting foot 56 and an upwardly extending long arm 57. The foot 56 is mechanically fastened by screws S to the bottom of the housing 12 and is made whereby to form an angle of greater than 90° with arm 57 before attachment in the coffee maker. The affixation of the foot 56 to housing 12 disposes the arm 57 at right angles to the foot 56 and thus arm 57 is spring biased toward the container 27 in order to urge the thermostat 47 against the container. A mechanical fastening of the thermostat 47 to the bracket 55 is envisioned wherein the upper end of the arm 57 is cut-out to form a seat 58 intermediate a pair of upstanding side ears 59 and 60. The ears 59 and 60 include holes which, as would be understood are spaced to align with the notches 53 and 54 so that screw fasteners S' may secure the mounting plate 51 to the bracket 55.

Preferably, the thermostat 47 is positioned so that the bi-metal disk 48 contacts the side of tank 27 just slightly above the upper loop of the heating coil 29 where rising heat from the coil will create the hottest spot. If temperatures exceeding the thermostat capacity are created at the bi-metal disk 48, as might occur when a defective or stuck running thermostat fails to switch off and continues to energize the heating element until finally all the water evaporates, the thermostat opens the circuit to de-activate the heater 29. The thermostat 47 is provided with a manual reset button 62, which requires the operator to make the necessary reset once the heater has been shut down. A manually resettable thermostat is preferable for this safety system, but alternatively, a self-resetting thermostat may also be used. Access to the reset button 62 is provided by a removably-capped peek hole means 61 located in positional correspondence with the thermostat 47 along the front face of the housing 12, as shown in FIG. 1. A small screwdriver, for example, may be used to push the button 62 and reset the thermostat for subsequent use.

Improved Running Thermostat System

The running thermostat system 28, which heretofore has been generally discussed with regard to activating and de-activating the heating element 29, will now be described in greater detail with reference made to FIGS. 3, 4, 6 and 7. System 28 is an improvement over previously known arrangements, particularly because the mean temperature of the entire water volume is sensed. Also, temperature variation is sensed within a very narrow range. These are significant advances in the beverage-making art because the device 10 is thereby rendered considerably more efficient by only operating the heating element when necessary.

The improved running thermostat system 28 includes a thermostat 63 located at the cover 30. The thermostat 63 has an adjustable control shaft 64 that enables the thermostat setting, and thereby the brewing water temperature, to be varied. Preferably, the thermostat 63 has the operating capacity of a ROBERTSHAW Controls Company thermostat No. K-944-12, or equivalent. Other suitable devices will be apparent to those skilled in the art. The thermostat 63 is affixed with a mounting flange 65 having a pair of engageable holes 66 and 67. A cooperative mounting bracket 68, best shown in FIGS. 4 and 7, supports the mounting flange 65, and thereby the thermostat 63, at cover 30. The bracket 68 comprises a lower plate 69 integrally formed with a vertical plate 70, which includes a vertical slot 71, a horizontal slot 72, and a central, upwardly open notch 73. The slots 71 and 72 correspond to the spacing of the holes 66 and 67 of the mounting flang 65. Screw fasteners 74 and 75 are provided to be received through the slots 71 and 72 and thereafter engaged within the holes 66 and 67 whereby to releasably hold the thermostat on the bracket. In this arrangement, the thermostat 63 is easily removable from the bracket 68 by partially unthreading the screws and thereafter simply moving the thermostat first upwardly to disengage the fastener 74 from the slot 71, and thereafter sidewardly to remove the fastener 75 from the slot 72. This removability is a significant advantage for repair personnel since, unlike previous devices, these threaded fasteners need not be removed and therefore cannot become accidentally dropped within the housing of the coffee-making device during repair.

A short capillary tube 76 associates with the thermostat 63 in a conventional manner. However, the capillary tube 76 does not extend downwardly into the container 27 to meet a bulb end, such as found in the prior art. Instead, a unique elongate and self-supporting sensing tube 77, best viewed in FIGS. 3 and 6, extends downwardly from the cover. The sensing tube 77 is joined to the capillary tube 76 interiorly of a fastening assembly 78, shown in the sectional view of FIG. 6. The sensing tube 77 offers a great advance over the existing thermostat systems inasmuch as no guide sleeve is needed. Further, the sensing tube need not be attached to the heating coil, which is customary with known guide sleeve systems in order for the bulb to be maintained in the proper vertical orientation at a specified depth within the hot water container.

The sensing tube 77 is hollow and is preferably made of stainless steel. A conventional oil is contained within the tube 77 and is in fluid communication with the capillary tube 76 as would be clear. Sensing tube 77 extends downwardly within the coils of the element 29 and terminates generally near the bottom thereof in a crimped end 79. The tube 77 thereby extends for substantially the full height of the container 27 and renders the system 28 capable of detecting the mean temperature of substantially the entire volume of water within the tank. Existing capillary bulb devices usually have an outer diameter of greater than 0.30 inches. Thus, a guide sleeve of greater diameter is required to surround the bulb end. In preferred form, the sensing tube 77 has an outside diameter less than 0.30 inches and therefore occupies a smaller space. It has been found that this thinner construction allows the oil therein to be quickly sensitive to the temperature changes whereby the temperature detected at the thermostat 63 is closely reflective of the temperature fluctuations within the tank. As a result, the sytem 28 is capable of responding to temperature change in a range of from about 2° to 3° F. spread and at least before a 6° F. change has occurred. Existing systems are less precise and are responsive to spreads of about 6° to 8° F., or more.

Reference is now made to the locking means 78 shown in the sectional view of FIG. 6. It will be seen that the capillary tube 76 is soldered to a tapering upper end of the sensing tube 77 generally denoted by reference numeral 80. A female fitting 81 is weld-connected within and around an aperture 82 extending through the cover 30. The fitting 81 includes a centrally threaded bore 83 which is thread engageable with a lock nut 84. The lock nut 84 is hollow whereby to permit the capillary tube to pass therethrough and be joined with the tube 77 at the solder connection 80. At its lower end, the bore 83 includes an inwardly extending annular shoulder 85 forming a bearing seat within the fitting 81. A collar 86 is soldered around the upper end of the sensing tube 77 generally below the solder connection 80 and includes a peripheral shoulder 87. Between the peripheral shoulder 87 and the annular shoulder 85, a water tight sealing means is provided by a rubber gasket 88 and metal washer 89, which are compressed by the lock nut 84 as it threads downwardly into engagement with the bore 83. Lock nut 84 also securely fastens the collar 87 within the fitting 81 and thereby fixes the sensing tube 77 in the orientation illustrated in FIG. 3.

It will be appreciated that the running thermostat system 28 is completely disengageable from the cover 30 without the removal or disturbance of any other components. Specifically, the thermostat 63 can be disengaged from the bracket 68 as explained, and by untightening the lock nut 84, the sensing tube, with the capillary 76 attached thereto, may be drawn upwardly out of the aperture 82 in a facile manner. When the need to replace the thermostat 63 arises, repair is therefore expedited and maintenance costs are reduced. It is contemplated that replacement of the thermostat 63 will not be required as often as with existing systems due to the capability of system 28 to sense the mean temperature of the water within a narrow temperature spread. By quickly reacting to the water temperature changes, the heater is activated before the temperature drops no more than 6° F. below the usually desired brewing temperature of 205° F. Furthermore, the heating element will not remain activated as long, since as the temperature is raised, the system 28 will react to de-activate the element at no greater than about 6° F. above the brewing temperature. This efficiency is critical with high capacity heaters because they tend to deteriorate much more quickly than the lower capacity elements. It will also be clear that the hot water is almost always made available at the proper temperature for making coffee. The capability of the system 28 to minimize this activation time and keep the water at the desired temperature are significant benefits of the invention.

Tap-Off Hot Water System

The invention further provides a tap-off hot water system which does not borrow from the water content within the container 27 and requires no float switch means. With reference to FIGS. 2, 3 and 9, it will be observed that the tap-off hot water system is generally denoted by reference numeral 93. A significant feature of the system 93 is that it taps cold water from the inlet pipe 32 by means of a T-fitting 94 located upstream of the inlet valve 33. A check valve 95 is connected to the T-fitting 94 by a suitable connecting pipe means whereby a minimum water pressure is required before water is introduced into the system. The check valve 95 has a conventional construction, as shown by the sectional view thereof in FIG. 9, wherein a spring biased valve 96 controls the passage of water from an inlet chamber 97 into an outlet chamber 98. In the preferred embodiment, the check valve 95 requires 2 p.s.i. of pressure to open.

Water conveyed through the check valve passes straight through a T-fitting 99 into a tube 100 which directs the cold water into a compression fitting 101 sealingly arranged within an aperture 101' at the cover 30.

The important characterizing feature of the tap-off hot water system is the arrangement of a water coil 102 within the container 27. The water coil 102, in preferred form, is a hollow stainless steel tubing having about at least an 8 ounce capacity. The coil 102 is concentrically arranged above heating element 29 and spaced below the cover 30 as shown in FIG. 3. Coil 102 includes an upright cold water receiving tube 103 communicating with the lowest loop of the coil and a shorter upright hot water outlet tube 104 communicating with the topmost loop of the coil. The tube 103 is connected to the compression fitting 101 below the cover 30 to be in fluid communication with the tube 100. Cold water entering from the tube 100 thereby circulates through the coil 102 and is quickly heated due to the constantly maintained temperature of the water resulting from the on and off activation of the heating element 29, as described above.

It will be observed that in the preferred embodiment the water coil 102 includes 14 loops arranged in a helical formation wherein adjacent loops are in contact. No need for additional heating of the coil is required since it is placed generally at the upper half of the container 27 and is continuously surrounded by hotter rising water circulating past the individual loops. A second compression fitting 105 is sealingly arranged within an aperture 105' of the cover 30 and is connected to the outlet tube 104 below the cover 30 and to a hot water discharge tube 106 above the cover. The discharge tube 106 conveys hot water outwardly of the container 27 to pass through a speed valve 107 associated therealong. The speed valve 107 is manually operable to permit varying the water pressure therethrough, such as when there are changes in the water supply pressure entering the inlet pipe 32. The outlet tube 106 extends generally horizontally toward the control panel 20 and is connected thereat with a lever-action faucet 26, as best viewed in FIGS. 1 and 2. The faucet 26 is preferably a conventional 100 p.s.i. to 150 p.s.i. faucet, well known to those skilled in this art.

When hot water is needed for making tea, instant soup, hot cocoa, etc., the faucet 26 is manually opened and cold water flows inwardly from the inlet 32 through the inlet tube 100 into the coil 102 to force hot water in the coil to be pressured outwardly thereof into the tube 106 and dispensed via the faucet 26. Due to the continuous heat transferred to the coil from the hot water in the container and the unique helical coil arrangement, by the time the cold water entering from the inlet tube 100 reaches the outlet tube 104, it is as substantially as hot as the brewing water within the container 27. Thus, a constant source of hot water is readily available without the need to borrow from the contents of container 27. It will be appreciated that there is no need to provide any float limit switches which are otherwise required in conventional hot water systems that simply drain the water tank to obtain hot water.

Since the water heated within the coil 102 will naturally expand and increase the pressure in the system 93, the faucet 26 may experience pressures in excess of its capacity and leak. Relief for this pressure is provided by a pressure chamber 108, which is connected to the transverse stem of the T-fitting 99 by a standard elbow 109, shown in FIG. 2. Any excess water pressure caused by expansion in the coil 102 will therefore be relieved through the tube 100 into the chamber 108 and prevent leakage at the faucet 26, or for that matter, at any other components within system 93.

The placement of the pressure chamber 108 is envisioned to be vertically within the lower housing 12 of the coffee maker 10 generally at a corner thereof and spaced from the container 27. In conventional housing designs, the standard box-shaped lower housing affords room at either of its rearward corners which provide sufficient space for stationing the pressure chamber 108.

An alternate embodiment of a pressure relief means for the system 93 is disclosed in FIG. 10. The same reference numerals are used to denote the system 93 in both FIGS. 2 and 10, with the exception that in FIG. 10 the inlet tube comprises two sections, denoted 100A and 100B, and it will be observed that these A and B sections are created by re-positioning the T-fitting 99. In this alternative, the pressure chamber 108 is deleted and the T-fitting 99 is re-located upwardly along the inlet tube section 100A generally adjacent the cover 30. The stem of the T-fitting is oriented in the opposite direction with respect to that shown in FIG. 2. In this embodiment, the stem of the T-fitting is engaged with the inlet tube section 100B, which directs the water flow into the coil 102 as explained above. The other arm of the T-fitting is connected to a standard pressure relief valve 110. The relief valve 110 preferably has an open pressure capacity of about 100 p.s.i. to 110 p.s.i., so that it will open at a pressure level below the pressure capacity of the faucet 26, as would be clear.

Downstream of the pressure relief valve 110 a suitable elbow 111 connects the valve to an everflow tube 112. The overflow tube 112 extends to pass through the wall of the basin 37 for discharge of overflow water into the basin. Thus, the system 93 will be relieved of excessive pressure by discharging it into the container 27 via the drain sump 38 in a similar manner to the action of the vent tube 44.

FIG. 11 shows a twin valve assembly 113 alternatively usable in the embodiment illustrated in FIG. 10. The twin valve assembly 113 includes, in a single housing, a check valve 114, a pressure relief valve 115, a T-fitting 116 and an elbow 117, which respectively replace the check valve 95, the pressure relief valve 110, the T-fitting 99 and the elbow 111, shown in FIG. 10. The check valve 114 and the pressure relief valve 115 are provided to open at the same respective levels of water pressure as described for the check valve 95 and the pressure relief valve 110. Thus, incoming water from the inlet tube section 100A is directed into the section 100B through the T-fitting 116. When excess pressure is experienced by the system, the relief valve 115 opens and directs water through the elbow 117 into the overflow tube 112. It is envisioned that the twin valve assembly 113 would be arranged within the system 93 in substantially the same location as the T-fitting 99 shown in FIG. 10.

In preferred form, the inlet and outlet pipe means for the system 93 comprise standard one-quarter inch copper tubing but, of course, they may have a larger or smaller size as needed.

While the hot water system 93 has been described in conjunction with a beverage-making device 10 having a high capacity heating coil 29, it should be apparent that the unique design for the water coil 102 permits the system to be equally suited for use in devices having a variety of heater arrangements. For example, the system 93 may be provided in combination with lower capacity heaters, such as the elements 118 and 118' (phantom lines) shown in FIGS. 14 and 15. The elements 118 and 118' each have a pair of terminals t and t' which are capable of being secured to a tank cover in substantially the same manner as the terminals T and T' of the heating coil 29. The element 118 is a 100–120 volt single loop heater having a 1300–1500 watt capacity, particularly useful for standard electrical circuits in the United States, Canada and Japan. The element 118' is a 220–240 volt single loop heater having an 1800 watt capacity for use in the standard electrical circuit systems found in Europe. Each heating element is formed to have a narrow elongate J-shape (FIG. 14) which is adapted to be arranged within a hot water tank generally at the central long axis thereof. It will be understood that the coil 102 is capable of being disposed within the tank to circumscribe either heater element 118 or 118' whereby the system 93 operates in the same way as explained above.

Clearly, the coil 102 may be provided to have a different diameter and number of looped coils so to be appropriately sized for various cylindrical tank dimensions. A wide variety of loop shapes are also intended to fall within the scope of the invention. It will be apparent that the water coil is not limited to a helical configuration and may be suitably shaped for use in containers that are polygonal in cross-section.

Improved Spray Disk Assembly

With reference to FIGS. 2 and 12, the improved spray disk assembly of the invention is shown and is generally denoted by reference numeral 43, previously mentioned above. FIG. 12 is an exploded perspective view of the assembly 43, which comprises a mounting collar 119 associating with a flexible gasket 120 and a spray disk 121. The mounting collar 119 is affixed at an undersurface 122 of the upper housing 11 around an opening 123 therethrough, which communicates with the siphon tube 42. The collar 119 comprises a circular top plate 124 having a central opening 123 arranged at the opening 123. In the exemplary V embodiment, the top plate 124 is welded to the undersurface 122 and has a depending peripheral side wall 125 formed therewith. The side wall 125 includes a pair of diametrically opposed bayonet slots 126 which downwardly open at 127 and upwardly terminate in horizontal portions 128. The gasket 120 is provided with an outside diameter substantially equal to the inside diameter of side wall 125 and has a height slightly less than the height of the side wall and sufficient to extend from the top plate 124 downwardly to meet the horizontal portions 128.

In the past, a siphon tube simply discharged onto a spray disk which was resiliently held by a mounting collar. The improved assembly 43 provides rigid locking and tight sealing between the mounting collar 119 and the disk 121 whereby leakage about the periphery of the disk 121 is avoided. The disk 121 is best described as a generally circular plate having a diameter sized to snugly fit within the side wall 125 and includes a pair of oppositely extending radial tongues 128. The tongues 128 include flat sections 129 adjacent the disk edge and terminate outwardly in U-shaped portions 130. By grasping the U-shaped portions 130, the flat sections 129 are engageable at the bayonet slots 126 by moving the disk 121 upwardly to dispose the sections 129 within the openings 127. Thereafter, the disk is rotated in a clockwise direction to securely lodge the sections 129 within the horizontal portions 128. Thereby, the gasket 120 is sealed against the top 124 and the disk 121 whereby to prevent leakage between the disk and the side wall 125.

The disk 121 is provided with a series of orifices 131 which are arranged to form a central imperforate portion 132. Water, discharging from the container 27 through the siphon tube 42, drips onto this imperforate portion 131 and flows outwardly therefrom to randomly drip through the orifices 131. As previously described, the flow control valve 35 preferably limits the inlet rate of water flow to the tank 27 to about 0.75 gallons per minute. As a result, water is siphoned from the tank 27 in a moderate pace whereby the water pressure emitted from the siphon tube 45 will be measured to be less than one inch of mercury.

The tight seal created by the locking engagement of the tongues 128 within the bayonet slots 126 assures that the water is directed through the orifices and is prevented from leaking around the edges of disk 121.

When cleaning is required due to the accumulation of lime, or other sediments, the operator can easily disconnect the disk by grasping the U-shaped portions 130 and then twisting the disk 121 counterclockwise to disengage the sections 129 from the slots 128. This locking feature of the assembly 43 will thereby be appreciated as providing a rigid, but removable, securement between the disk 121 and the mounting collar 120, while completely eliminating any reliance upon resilient connections which have proven unsuccessful heretofore.

Drain System

A unique drain system 133 is provided for emptying the hot water container of the beverage-making device 10 and is best viewed with reference to FIGS. 3 and 13. The drain system 133 associates with a central drain hole 134 at the bottom 135 of the container 27. The system 133 includes a drain fitting 136 which has an open bore 137 for receiving drainage therethrough and an upper annular flanged seat 138 residing interiorly of the container 27. A threaded stem 139 is integrally formed with the seat 138 and extends downwardly through the drain hole 134. The bottom of the seat 138 is beveled at 140 and the container bottom 135 includes a cooperatively depressed annular bevel 140' around the drain hole 134 whereby the seat 138 can be flushly and tightly sealed at the bottom 135.

A coupling means comprising a female elbow 141 is provided for engagement with the external threading of the fitting 136. In order for the elbow 141 to threadably engage the fitting 136, the drain hole 134 and the stem 139 have flat sides 142 and 143, respectively. Thereby, the bottom 135 is cooperative to act like a wrench and prevent the fitting 136 from rotating in order to facilitate the engagement, or disengagement, of the elbow 141.

The elobw 141 includes an upper annular seat 144 for the accommodation of an O-ring 145 therein. Upon thread engaging the elbow 141 to the drain fitting 136, the O-ring 145 is compressed to seal against the undersurface of the annual bevel 140' to prevent leakage therearound. A standard male coupling 146 engages the outlet side of the elbow 141, and at its opposite end engages with a reducer coupling 147. A third coupling 148 engages the other side of the reducer coupling 147. Lastly, a manually operable drain cock 149 engages the outlet end of the coupling 148. The coupling assembly 146–148 is of a sufficient length whereby to dispose a drain cock 149 adjacent the housing 12. An access cut-out (not shown) is provided through the housing so that the drain cock can be easily reached when needed. In FIG. 3, a hose 150, shown in phantom, is connected to the drain cock in order to drain the water from the tank 27 into a sink, pail, etc.

In conventional beverage-making devices, a removable rear panel is provided so that access to the internal components can be obtained for maintenance and repair. By the provision of the drain system 133, it will be clearly understood that the elbow 141, the coupling assembly 146–148 and the drain cock 149 are fully removable as a unit by simply disconnecting the elbow 141 from the drain fitting 136. Thus, not only can the system 133 be repaired, if necessary, but other surrounding components within the device 10 may be easily reached by simply removing, and later easily replacing, the system.

The system 133 required no welded connection with the tank 27, and therefore the corrosion problems inherent in previously known welded fittings is totally eliminated.

ACHIEVEMENTS

An improved beverage-making device has been disclosed which safely and efficiently controls the heating element for the hot water container by the provisions of an improved safety thermostat arrangement and an improved running thermostat system. Additionally, the invention includes a tap-off hot water system which dispenses hot water without borrowing from the hot water container. Further, the invention achieves the goal of providing an improved spray disk assembly that offers a tightly sealing locking means for the disk whereby the brewing water is evenly and moderately distributed over all the coffee grounds contained in the brewing chamber. Moreover, the invention provides for the complete draining of the hot water tank by means of a unique bottom drain system removably engaged at the bottom of the container in a tightly sealing non-corrosive connection.

While the foregoing description of the invention has been directed toward a preferred embodiment therefor, it will be apparent to others that various modifications and alternative embodiments fall within the scope of this disclosure and the claims appended hereto.

What is claimed is:

1. In a beverage-making device of the type generally defined by an upper and lower housing, a hot water container arranged in the lower housing, said hot water container fluidly communicating with outlet means for discharging heated water therefrom and directing the water to a perforate spray disk means, said spray disk means associating with said upper housing at an aperture therethrough whereby discharging water is directed to be dispensed downwardly therefrom, the improvement comprising a spray disk assembly having mounting collar means arranged at said upper housing and including aperture means in fluid communication with said outlet means, said mounting collar means further having a continuous downwardly open side wall, said side wall including at least one engageable slot having a downwardly open portion and a horizontal slot extending therefrom, a perforate spray disk capable of fitting within said continuous side wall, said spray disk having at least one outwardly extending portion capable of engaging said engageable slot, and a flexible gasket arranged within said mounting collar means and capable of forming a seal between said mounting collar means and spray disk upon engagement of the extending portions at said engageable slot, whereby water discharged from said outlet means is constrained to flow through said perforate disk and wherein leakage between the side wall of the mounting collar means and the spray disk is prevented.

2. The improvement as in claim 1 wherein the flexible gasket has a height slightly less than the height of the side wall.

3. The improvement as in claim 2 wherein the perforate spray disk includes a plurality of perforations arranged in a pattern to form an imperforate portion of the spray disk directly below said mounting collar aperture means.

4. The improvement as in claim 2 wherein the engageable portion of the spray disk includes a flat section adjacent the disk and a U-shaped portion spaced outwardly from the disk, whereby the U-shaped portion provides holding means for manually engaging said spray disk to said mounting collar means.

5. The improvement as in claim 2 wherein the pressure of the hot water emitted from said outlet means is no greater than one inch of mercury.

* * * * *

UNITED STATES PATENT AND TRADEMARK OFFICE
CERTIFICATE OF CORRECTION

PATENT NO. : 4,603,621

DATED : August 5, 1986

INVENTOR(S) : Melvin F. Roberts

It is certified that error appears in the above-identified patent and that said Letters Patent are hereby corrected as shown below:

At Co. 3, line 37, please delete the word "void" and insert therefor the word -- avoid --;

Col. 13, line 39, please delete the misspelled word "everflow" and insert therefor -- overflow --;

Col. 14, line 48, please delete the single capitalized letter "V"; and at

Col. 15, line 62, please delete the misspelled word "elobw" and insert therefor the word -- elbow --.

Signed and Sealed this

Twenty-first Day of April, 1987

Attest:

DONALD J. QUIGG

Attesting Officer

Commissioner of Patents and Trademarks